(12) United States Patent
Wang

(10) Patent No.: US 8,087,861 B2
(45) Date of Patent: Jan. 3, 2012

(54) PLATE MEMBER FASTENER

(76) Inventor: Kuo-Chung Wang, Siluo Township, Yunlin County (TW)

( * ) Notice: Subject to any disclaimer, the term of this patent is extended or adjusted under 35 U.S.C. 154(b) by 282 days.

(21) Appl. No.: 12/464,891

(22) Filed: May 13, 2009

(65) Prior Publication Data

US 2010/0290860 A1 Nov. 18, 2010

(51) Int. Cl.
*F16B 39/00* (2006.01)
(52) U.S. Cl. .............................. 411/107; 411/353
(58) Field of Classification Search .............. 411/352, 411/353, 107, 396; 29/525.01
See application file for complete search history.

(56) References Cited

U.S. PATENT DOCUMENTS

| | | | | |
|---|---|---|---|---|
| 7,213,321 B2* | 5/2007 | Franco et al. | ............... | 29/453 |
| 7,905,696 B2* | 3/2011 | Chiu | ............... | 411/353 |
| 7,938,607 B2* | 5/2011 | Wang | ............... | 411/107 |
| 2005/0129483 A1* | 6/2005 | McAfee | ............... | 411/353 |
| 2008/0146092 A1* | 6/2008 | Taylor et al. | ............... | 439/883 |
| 2009/0301768 A1* | 12/2009 | Liu | ............... | 174/257 |

* cited by examiner

*Primary Examiner* — Gary Estremsky
(74) *Attorney, Agent, or Firm* — Muncy, Geissler, Olds & Lowe, PLLC

(57) ABSTRACT

A method for making a barrel for plate member fastener and installing the barrel in a first metal plate member for enabling the plate member fastener to affix the first metal plate member to a second metal plate member is disclosed to include the step of machining a metal base material into a barrel having a bottom bonding flange and a bottom extension tube around a bottom opening thereof and then affixing a solder mask to the bottom extension tube around the bottom opening and the step of fitting the bottom extension tube of the barrel into a mounting through hole of the first metal plate and abutting the bottom bonding flange of the barrel against a solder paste at the top wall of the first metal plate member and then applying a reflow soldering process to bond the bottom bonding flange of the barrel to the top wall of the first metal plate member.

12 Claims, 8 Drawing Sheets

PLATE MEMBER FASTENER

BACKGROUND OF THE INVENTION

1. Field of the Invention

The present invention relates to a method for making a barrel for plate member fastener and installing the barrel in a first metal plate member for enabling the plate member fastener to affix the first metal plate member to a second metal plate member. The invention also relates to a plate member fastener for joining two metal plate members of which the barrel that is to be bonded to the first metal plate member by a reflow soldering process has a solder mask at the bottom side to prevent solder paste bridging and wicking under components.

2. Description of the Related Art

When fastening plate members together, a positioning screw formed of a knob, a ring and a screw nail is usually used. During installation, the screw nail and the ring are secured to the first plate member, and then the knob is rotated to drive the screw nail into the second plate member, and then a hand tool is used to fasten tight the screw nail, affixing the first and second plate members together. This plate member joining method can be used in a machine tool to join plate members together.

The power drive or speed-adjustment unit of a machine tool is provided inside the housing. To facilitate repair of the machine tool or adjustment of the output speed of the machine tool, a detachable plate member is usually provided at the housing of the power drive or speed-adjustment unit. Screw bolts are commonly used to fasten the movable plate member to the housing. When unfastening screw bolts to dismount a movable plate member from the housing, the associating lock nuts may fall from the screw bolts.

There is known a plate member fastener comprised of a cap, a screw, a spring member and a locating base for joining two metal plate members together. After fixation of the locating base of the plate member fastener to a through hole on a first plate member, the screw is threaded into a screw hole on a second plate member to secure the first plate member and the second plate member together. Because the locating base of the plate member fastener is kept secured to the first plate member after removal of the first plate member from the second plate member, the plate member fastener will not be missed by accident. During installation of the plate member fastener, an automatic installation machine is used to pick up the locating base and then to insert the locating base into the mounting through hole of the first plate member. Thereafter, the locating base is bonded to the first plate member with a solder paste by means of a reflow soldering process, and then the spring member is sleeved onto the screw inside the cap and supported between the cap and locating base at the first plate member after insertion of the screw into the locating base and fastening of the screw to the second plate member.

The locating base is a hollow member made of stainless steel or any other metal material processed through a surface treatment (electroplating or chemical plating). The surface characteristic of the locating base does not facilitate the performance of soldering, therefore a solder paste must be used and applied to the front side of the locating base and/or the top wall of the first plate member when performing a reflow soldering to bond the locating base to the first metal plate member. During reflow soldering, the liquefied solder paste may permeate through gaps in between the locating base and the first metal plate member, resulting in solder paste bridging and wicking under components. When this problem happens, the solder paste may block the bottom opening side of the locating base, complicating further mounting of the screw of the plate member fastener and weakening the bonding strength between the locating base and the first metal plate member Accordingly, there is a need for plate member fastener that overcomes, alleviates, and/or mitigates one or more of the aforementioned and other deleterious effects of the prior art plate member fastener.

SUMMARY OF THE INVENTION

The present invention has been accomplished under the circumstances in view. It is therefore an object of the present invention to provide a plate member fastener for joining metal plate members, which prevents solder paste bridging and wicking under components during a reflow soldering process to bond the barrel of the plate member fastener to the first metal plate member.

It is another object of the present invention to provide a plate member fastener for joining metal plate members, which has a solder masking layer provided at the bottom extension tube, assuring designed bonding area of the solder paste between the bonding flange and the surface of the first metal plate member around the mounting though hole and improving the bonding strength, and avoiding masking of the bonded structure. To achieve these and other objects of the present invention, a method for making a barrel for plate member fastener and installing the barrel in a first metal plate member for enabling the plate member fastener to affix the first metal plate member to a second metal plate member is disclosed to include the step of machining a metal base material into a barrel having a bottom bonding flange and a bottom extension tube around a bottom opening thereof and then affixing a solder mask to the bottom extension tube around the bottom opening and the step of fitting the bottom extension tube of the barrel into a mounting through hole of the first metal plate and abutting the bottom bonding flange of the barrel against a solder paste at the top wall of the first metal plate member and then applying a reflow soldering process to bond the bottom bonding flange of the barrel to the top wall of the first metal plate member.

To achieve these and other objects of the present invention, a plate member fastener for joining a first metal plate member to a second metal plate member is disclosed to include a barrel, a screw member, a cap and a spring member. The barrel has an inside accommodation space extending through top and bottom sides thereof, a step located on the inside thereof around the inside accommodation space, a top coupling flange extending around the periphery of the top side thereof, a bottom extension tube axially forwardly extended from the bottom side thereof and fitted into a mounting through hole of the first metal plate member, and a solder mask coated on the bottom extension tube. The screw member has a head, a shank perpendicularly extended from the bottom wall of the head for insertion through the mounting through hole of the first metal plate member, a thread spirally extending around the periphery of the shank for threading into the screw hole of the second metal plate member, and a shoulder connected between the head and the shank. The cap is fixedly fastened to the head of the screw member, having a center opening axially extending through the top and bottom sides thereof for receiving the barrel, the screw member and the spring member, bottom coupling means located on the bottom side thereof and coupled to the top coupling flange of the barrel and movable with the cap relative to the barrel between the top coupling flange and the bottom extension tube of the barrel. The spring member is received inside the barrel and stopped between the step of the barrel and the head of the screw member to impart an outward pressure to the cap relative to the barrel.

DETAILED DESCRIPTION OF THE PREFERRED EMBODIMENT

Figure 1:
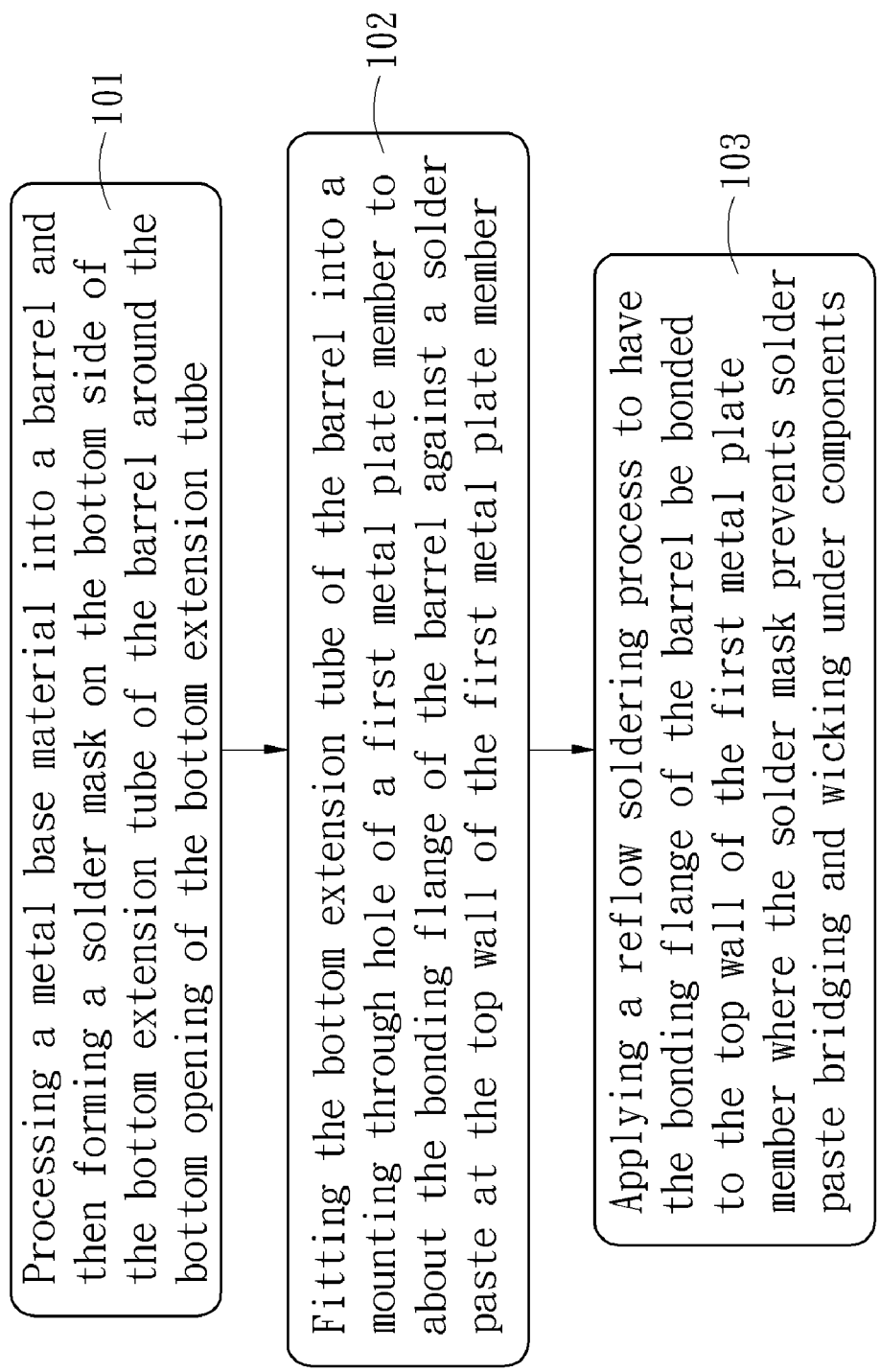
FIG. 1 is a flow chart of a method for making a barrel for plate member fastener and installing the barrel in a first metal plate member in accordance with a first embodiment of the present invention.
Figure 2:
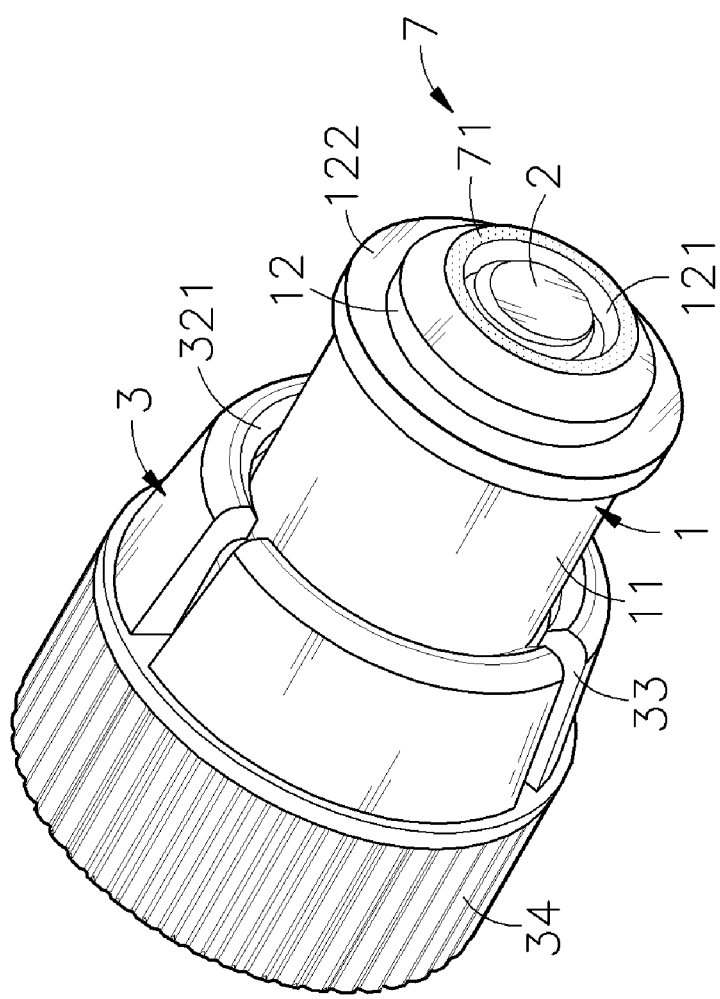
FIG. 2 is an elevational assembly view of a plate member fastener in accordance with the present invention.
Figure 3:
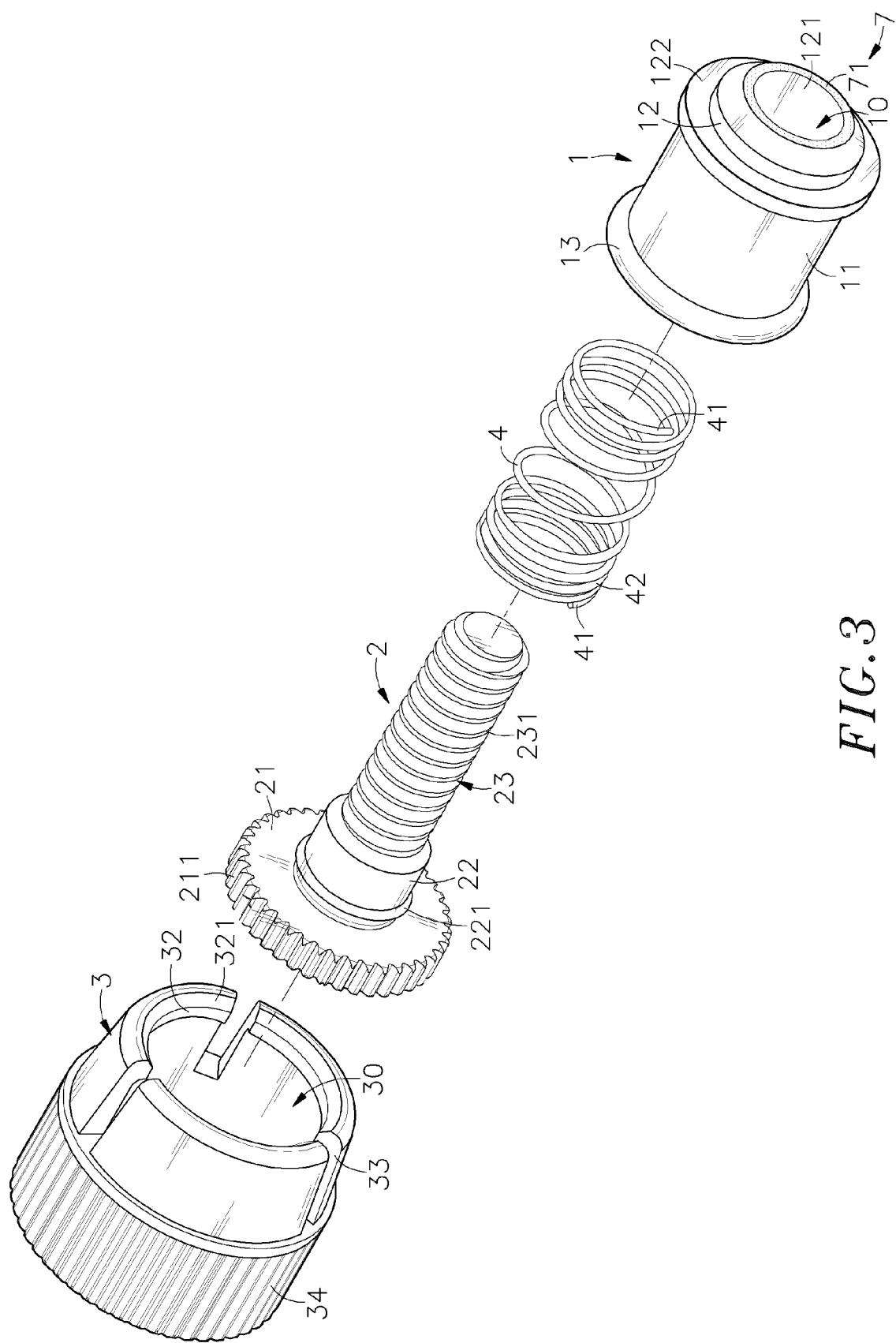
FIG. 3 is an exploded view of the plate member fastener in accordance with the present invention.
Figure 4:
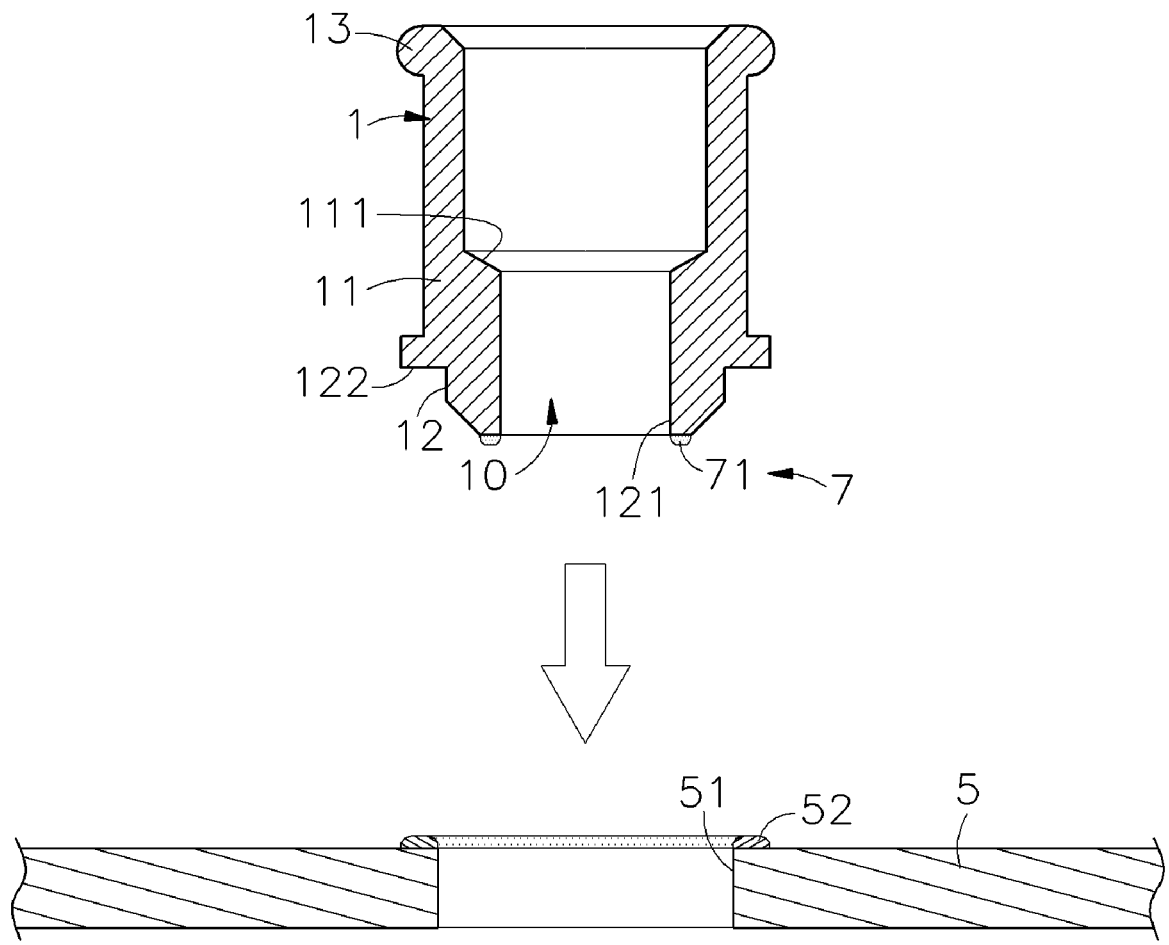
FIG. 4 is a sectional view of the present invention, showing the relationship between the barrel and a first metal plate member before bonding.
Figure 5:
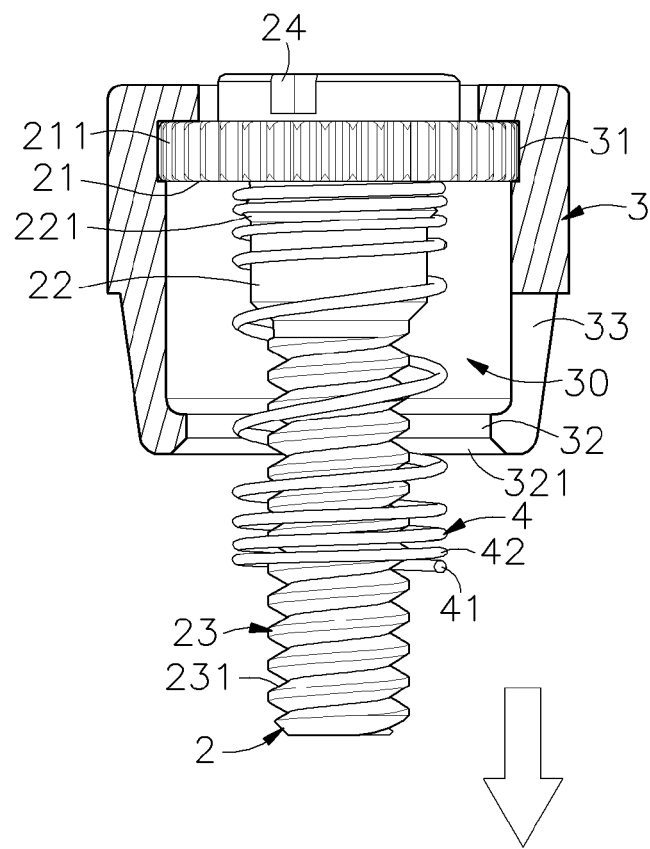
FIG. 5 is a schematic sectional view of the present invention, showing the barrel fastened to the first metal member and the spring member sleeved onto the shoulder of the screw member inside the cap before installation in the barrel.
Figure 5:
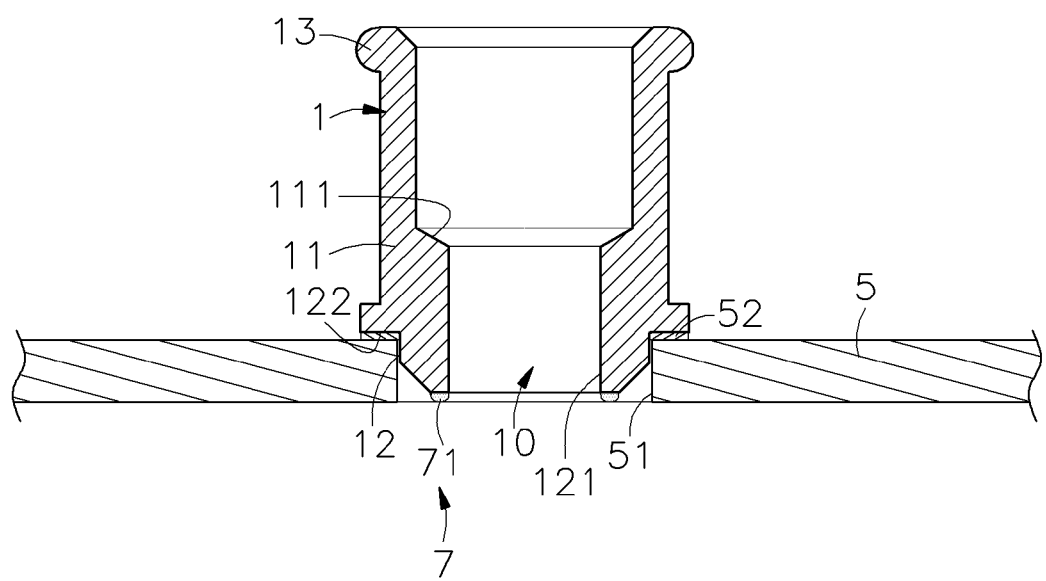
Figure 6:
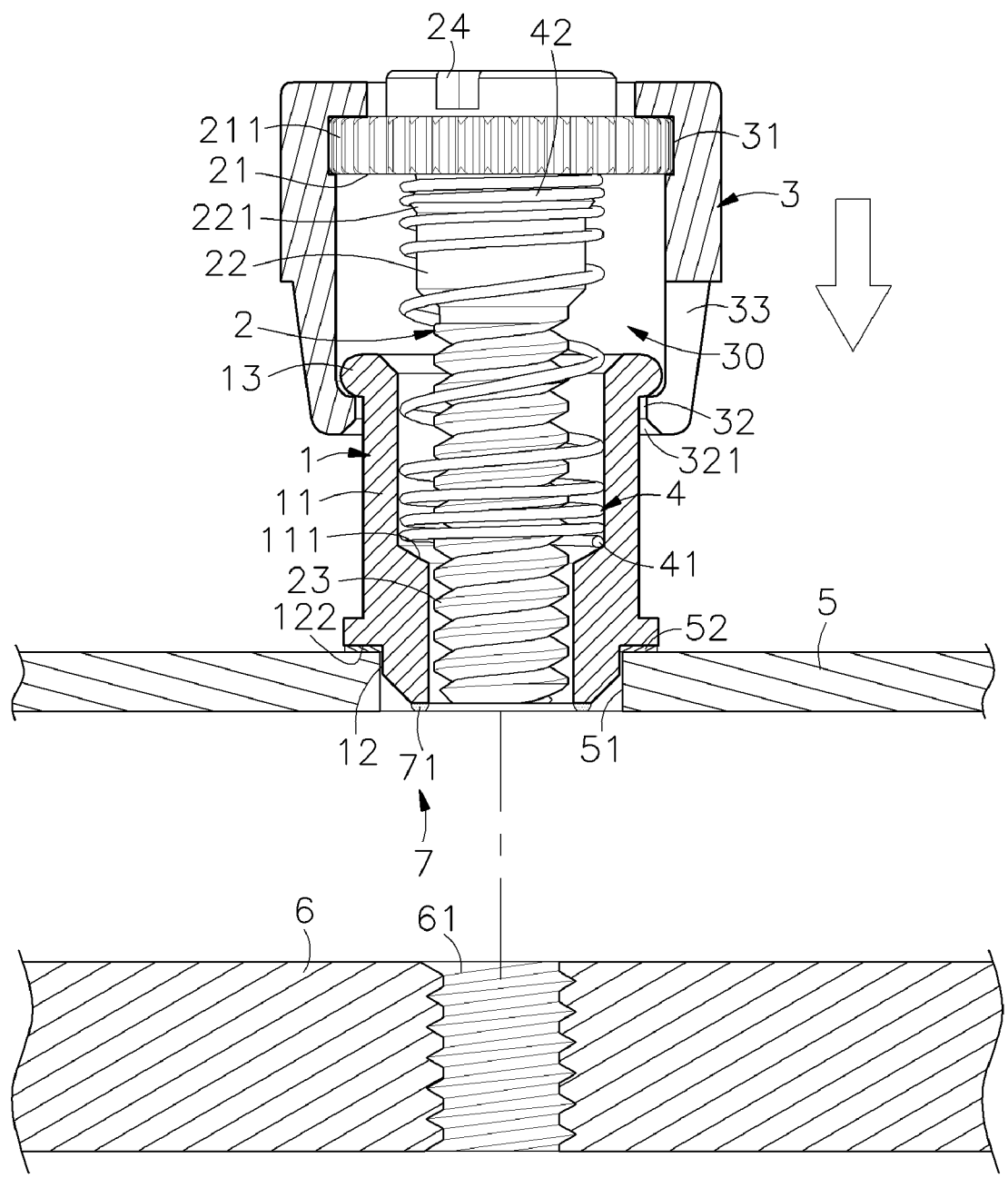
FIG. 6 is a schematic sectional view of the present invention, showing the plate member fastener installed in the first metal plate member before connection of the first metal plate member to the second metal plate member.
Figure 7:
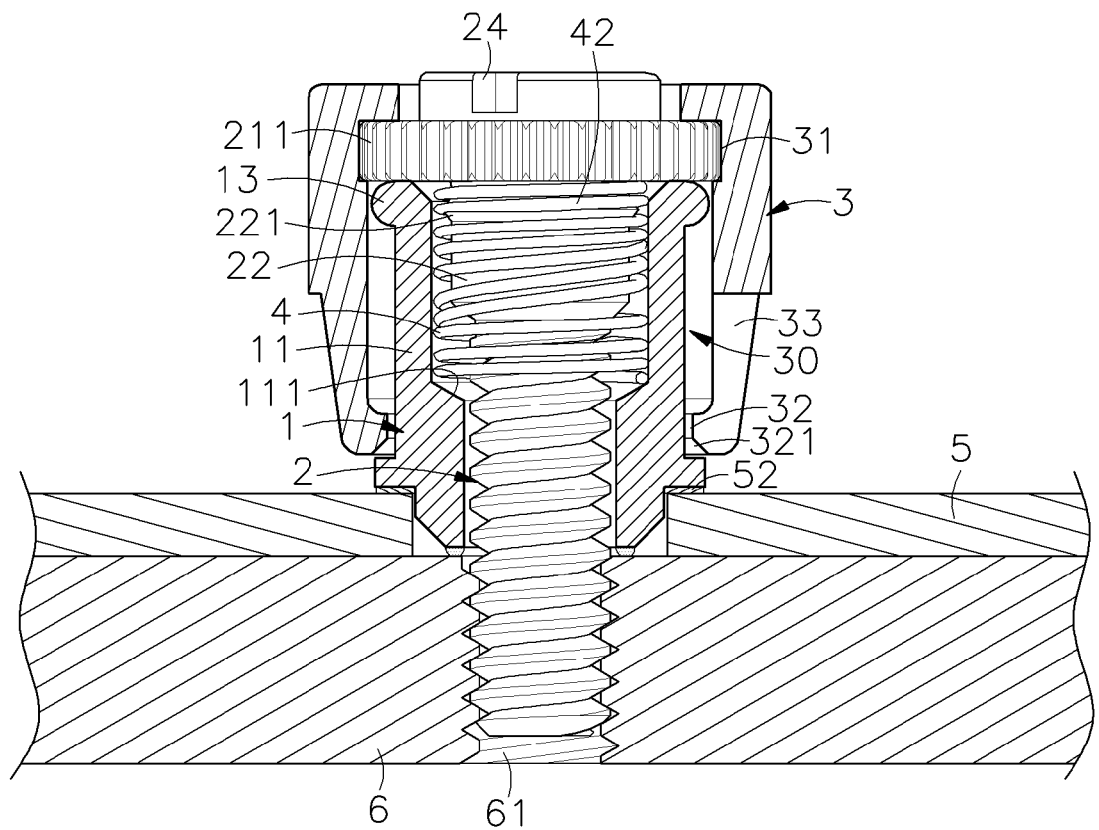
FIG. 7 corresponds to FIG. 6, showing the screw member of the plate member fastener fastened to the screw hole of the second metal plate member at the bottom side of the first metal plate member.

Referring to FIGS. 1~5, a plate member fastener in accordance with the present invention is shown comprising a barrel 1, a screw member 2, a cap 3, and a spring member 4. The invention provides a method for the production and installation of the barrel 1 for plate member fastener includes the steps of:

(101) processing a metal base material prepared from stainless steel, copper or any other suitable metal material into a barrel 1 having a tubular body 11, a bottom extension tube 12 extending from the bottom open side of the tubular body 11 and defining a bottom opening 121, a bottom bonding flange 122 extending around the periphery of the bottom side of the tubular body 11 and a top coupling flange 13 extending around the periphery of the top open side of the tubular body 11, and then forming a solder mask 7 on the bottom side of the bottom extension tube 12 around the opening 121;

(102) fitting the bottom extension tube 12 of the barrel 1 into a mounting through hole 51 of a first metal plate member 5 to abut the bottom bonding flange 122 of the barrel 1 against a solder paste 52 being applied to the top wall of the first metal plate member 5 around the mounting through hole 51; and (103) applying a reflow soldering process to have the bottom bonding flange 122 of the barrel 1 be bonded to the top wall of the first metal plate member 5 where the solder mask 7 prevents solder paste bridging and wicking under components.

Figure 8:
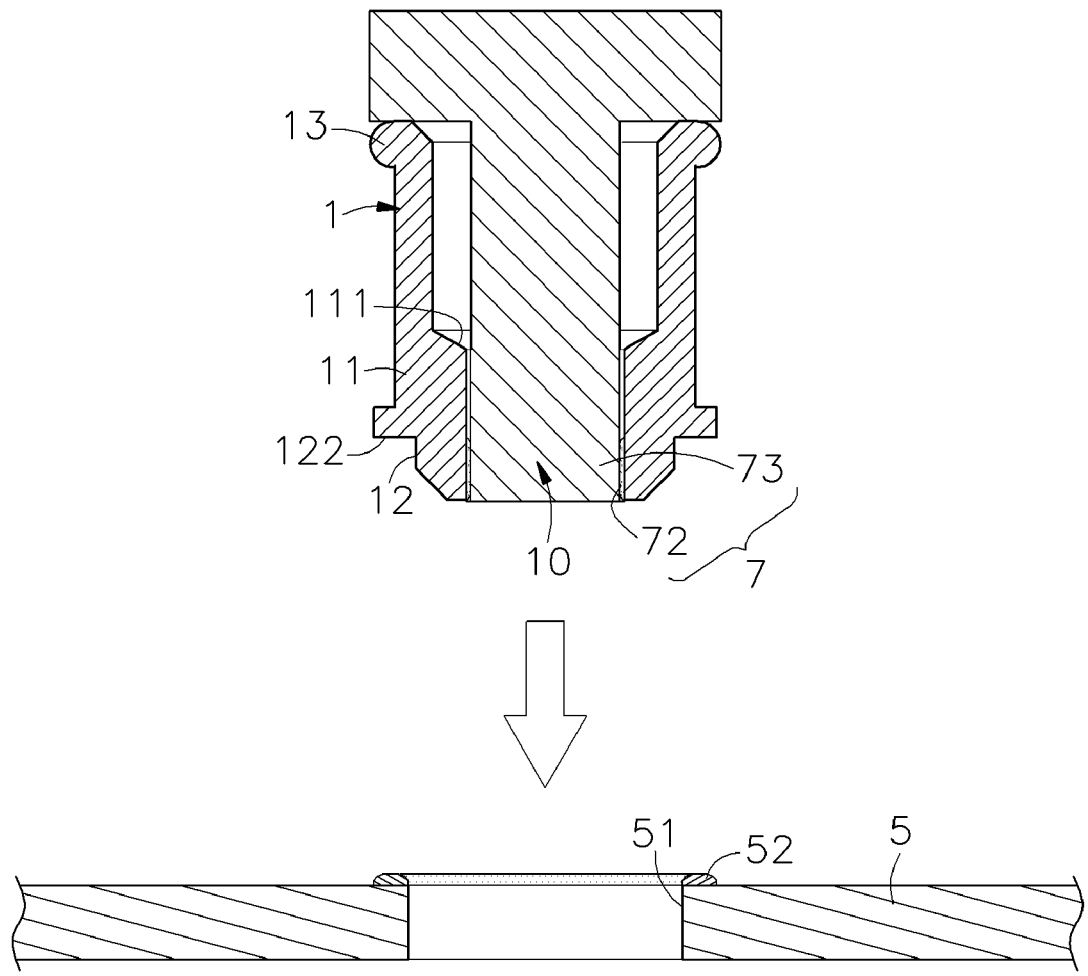
FIG. 8 is a sectional view of another embodiment of the present invention, showing the relationship between the barrel and a first metal plate member before bonding.

In the aforesaid procedure, the metal base material for making the barrel 1 can be prepared from stainless steel, copper, or any suitable metal material. After formation of the barrel 1, the solder mask 7 is affixed to the bottom side of the bottom extension tube 12 around the opening 121 or the inside wall of the bottom extension tube 12. Thereafter, the bottom extension tube 12 of the barrel 1 is fitted into the mounting through hole 51 of the first metal plate member 5 to abut the bottom bonding flange 122 of the barrel 1 against the solder paste 52 that was applied to the top wall of the first metal plate member 5 around the mounting through hole 51, and then a reflow soldering process is employed to bond the bottom extension tube 12 of the barrel 1 to the top wall of the first metal plate member 5. During the reflow soldering process, the solder mask 7 prevents solder paste bridging and wicking under components, and therefore the bonding force and soldering strength are enhanced. Further, the solder mask 7 can be a solder masking layer 71 formed of a screen printable epoxy ink, liquid solder mask ink or dry film solder mask on the bottom side of the bottom extension tube 12 around the opening 121 by means of screen printing, spray paining or any suitable coating technique (see FIG. 4). Alternatively, the solder mask 7 can be a metal coating 72 coated on the inside wall of the bottom extension tube 12, for example, the metal coating 72 can be a zinc or zinc alloy coating formed by means of hot dip galvanizing or electroplating (see FIG. 8). During installation, a plug 73 is inserted into the barrel 1 and kept in flush with the bottom side of the bottom extension tube 12, and then the bottom extension tube 12 of the barrel 1 is fitted into the mounting through hole 51 of the first metal plate member 5 to abut the bottom bonding flange 122 of the barrel 1 against the solder paste 52 at the top wall of the first metal plate member 5 around the mounting through hole 51, and then a reflow soldering process is employed to bond the bottom extension tube 12 of the barrel 1 to the top wall of the first metal plate member 5. When fitting the bottom extension tube 12 of the barrel 1 into the mounting through hole 51 of the first metal plate member 5, the plug 73 prohibits the solder paste 52 from permeating into the inside of the barrel 1. After the barrel 1 has been bonded to the top wall of the first metal plate member 5, the plug 73 is removed from the barrel 1.

Referring to FIGS. 3~7, as stated above, a plate member fastener in accordance with the present invention comprises a barrel 1, a screw member 2, a cap 3, and a spring member 4.

The barrel 1 is a hollow cylindrical metal member having an inside accommodation space 10 extending through top and bottom sides thereof, a step 111 located on the inside around the inside accommodation space 10, a top coupling flange 13 extending around the periphery of the top side, a bottom extension tube 12 axially forwardly extended from the bottom side, and a bottom bonding flange 122 extending around the periphery of the bottom side.

The screw member 2 is a metal member having a head 21, an engagement portion 211 formed on the periphery of the head 21, a shank 23 perpendicularly extended from the center of the bottom wall of the head 21, a thread 231 spirally extending around the periphery of the shank 23, a shoulder 22 connected between the bottom wall of the head 21 and the shank 23, a retaining rib 221 extending around the periphery of the shoulder 22, and a tool groove 24 located on the top wall of the head 21. Further, the tool groove 24 can be a Phillipes groove, keystone groove, asterisk groove or hex groove.

The cap 3 is a hollow member having a center opening 30 axially extending through the top and bottom sides for receiving the barrel 1, the screw member 2 and the spring member 4, an inside retaining groove 31 extending around the inside wall near the top side for retaining the engagement portion 211 of the screw member 2 (see FIG. 5), bottom coupling means 32, i.e., bottom coupling flange extending around the inside wall of the bottom side, a plurality of longitudinal crevices 33 equiangularly spaced around the periphery and respectively extended to the bottom side to separate the bottom coupling flange 32 into multiple parts, and a grip 34 located on the periphery at the top side for gripping by hand. Further, the bottom coupling flange 32 has a beveled guide edge 321 that facilitates insertion of the top coupling flange 13 of the barrel 1 into engagement with the bottom coupling flange 32 of the cap 3.

The spring member 4 is sleeved onto the screw member 2, having a deformable coiled body 42 shank 23 of the screw member 2 and two end portions 41 at the two distal ends of the deformable coiled body 42. One end portion 41 is forced into engagement with the retaining rib 221 around the shoulder 22 of the screw member 2 and stopped against the bottom wall of the head 21. The other end portion 41 is supported on the step 111 inside the barrel 1.

The aforesaid screw member 2 is made of metal. The cap 3 is directly molded on the head 21 of the screw member 2 with over-molding technology. After molding, the engagement portion 211 of the head 21 of the screw member 2 that can be formed of a series of barbs, teeth or protruding ribs is formed integral with the retaining groove 31 of the cap 3 so that a user can drive the grip 34 to rotate the screw member 2 into the workpiece.

During application, an automatic installation machine can be used to pick up the plate member fastener and then to insert the bottom extension tube 12 of the barrel 1 of the plate member fastener into the mounting through hole 51 of the first metal plate member 5 and to attach the bottom bonding flange 122 of the barrel 1 to the solder paste 52 that was applied to the border area of the mounting through hole 51 of the first metal plate member 5, and then a reflow soldering process is applied to have the barrel 1 be bonded to the first metal plate 5.

After installation of the barrel 1 in the first metal plate member 5, sleeve the spring member 4 onto the shank 23 and shoulder 22 of the screw member 2 to force one end portion 41 of the spring member 4 into engagement with the retaining rib 221 of the screw member 2, avoiding tripping of the spring member 4 off the screw member 2 upon a vibration during delivery by an automatic installation machine. Thereafter, insert the shank 23 of the screw member 2 into the accommodation space 10 of the barrel 1 to have the two end portions 41 of the spring member 4 be respectively stopped against the step 111 inside the barrel 1 and the bottom wall of the head 21 of the screw member 2, and then force the cap 3 downwards to move the beveled guide edge 321 of the bottom coupling flange 32 of the cap 3 over the top coupling flange 13 of the barrel 1. At this time, the longitudinal crevices 33 enable the split bottom coupling flange 32 to expand and to be moved over the top coupling flange 13 of the barrel 1 smoothly. After the bottom coupling flange 32 of the cap 3 is moved over the top coupling flange 13 of the barrel 1, release the pressure from the cap 3 for enabling the spring member 4 to return to its former shape and to push the screw member 2 and the cap 3 outwards relative to the barrel 1 to the position where the bottom coupling flange 32 of the cap 3 is stopped at the bottom side of the top coupling flange 13 of the barrel 1. Thus, the plate member fastener is assembled, and the screw member 2 is prohibited from escaping from the barrel 1.

When fastening the first metal plate member 5 to the second metal plate member 6, attach the first metal plate member 5 to the second metal plate member 6 to keep the mounting through hole 51 of the first metal plate member 5 in alignment with the screw hole 61 of the second metal plate member 6, and then force the cap 3 downwards and rotate the cap 3 to drive the outer thread 231 of the screw member 2 into the screw hole 61 of the second metal plate member 6, and then attach a hand tool (for example, screwdriver) to the tool groove 24 of the screw member 2 and rotate the hand tool to tighten up the connection between the screw member 2 and the second metal plate member 6. Thus, the first metal plate member 5 and the second metal plate member 6 are firmly secured together by the plate member fastener.

While the present disclosure has been described with reference to one exemplary embodiment, it will be understood that the description of the exemplary embodiment is not a limitation of the invention. The barrel 1 of the plate member fastener has a solder masking layer 71 formed of a screen printable epoxy ink, liquid solder mask ink or dry film solder mask on the bottom side of the bottom extension tube 12 around the opening 121 by means of screen printing, spray paining or coating technique or a dry film of zinc or zinc alloy coating 72 coated on the inside wall of the bottom extension tube 12 by means of hot dip galvanizing or electroplating. During installation, a plug 73 is inserted into the barrel 1 and kept in flush with the bottom side of the bottom extension tube 12, and then the bottom extension tube 12 of the barrel 1 is fitted into the mounting through hole 51 of the first metal plate member 5 to abut the bottom bonding flange 122 of the barrel 1 against the solder paste 52 at the top wall of the first metal plate member 5 around the mounting through hole 51, and then a reflow soldering process is employed to bond the bottom extension tube 12 of the barrel 1 to the top wall of the first metal plate member 5. When fitting the bottom extension tube 12 of the barrel 1 into the mounting through hole 51 of the first metal plate member 5, the plug 73 prohibits the solder paste 52 from permeating into the inside of the barrel 1. After the barrel 1 has been bonded to the top wall of the first metal plate member 5, the plug 73 is removed from the barrel 1. Thus, the screw member 2 can be conveniently mounted with the cap 3 and the spring member 4 in the barrel 1 at the first metal plate member 5 and then threaded into the screw hole 61 of the second metal plate member 6 to affix the first metal plate member 5 and the second metal plate member 6 together.

Although a particular embodiment of the invention has been described in detail for purposes of illustration, various modifications and enhancements may be made without departing from the spirit and scope of the invention. Accordingly, the invention is not to be limited except as by the appended claims.

What the invention claimed is:

1. A plate member fastener for fastening to a mounting through hole of a first metal plate member and a screw hole of a second metal plate member to join said first metal plate member and said second metal plate member together, the plate member fastener comprising:

a barrel, said barrel having an inside accommodation space extending through top and bottom sides thereof, a step located on the inside thereof around said inside accommodation space, a bottom extension tube axially forwardly extended from the bottom side around a bottom opening thereof and fitted into the mounting through hole of said first metal plate member, and a solder mask covered on said bottom extension tube;

a screw member, said screw member having a head, a shank perpendicularly extended from a bottom wall of said head for insertion through the mounting through hole of said first metal plate member, a thread spirally extending around the periphery of said shank for threading into the screw hole of said second metal plate member, and a shoulder connected between said head and said shank;

a cap fixedly fastened to the head of said screw member, said cap having a center opening axially extending through top and bottom sides thereof for receiving said barrel, said screw member and said spring member; and a spring member received inside said barrel and stopped between the step of said barrel and the head of said screw member to impart an outward pressure to said cap relative to said barrel.

2. The plate member fastener as claimed in claim 1, wherein said solder mask is a screen printable epoxy ink affixed to a bottom side of said bottom extension tube around said bottom opening by means of screen printing.

3. The plate member fastener as claimed in claim 1, wherein said solder mask is a liquid solder mask ink affixed to said bottom extension tube around said bottom opening by means of spray painting.

4. The plate member fastener as claimed in claim 1, wherein said solder mask is a dry film solder mask affixed to said bottom extension tube around said bottom opening by means of a coating technique.

5. The plate member fastener as claimed in claim 1, wherein said solder mask is a zinc coating coated on an inside wall of said barrel by means of one of hot-dip coating and electroplating techniques; the plate member fastener further comprising a plug detachably inserted into said barrel and kept in flush with the bottom side of said bottom extension tube of said barrel before fitting said bottom extension tube of said barrel into said mounting through hole of said first metal plate.

6. The plate member fastener as claimed in claim 1, wherein said solder mask is a zinc alloy coating coated on an inside wall of said barrel by means of one of hot-dip coating and electroplating; the plate member fastener further comprising a plug detachably inserted into said barrel and kept in flush with the bottom side of said bottom extension tube of said barrel before fitting said bottom extension tube of said barrel into said mounting through hole of said first metal plate.

7. The plate member fastener as claimed in claim 1, wherein said barrel has a top coupling flange extending around the periphery of the top side thereof; said cap has a bottom coupling means located on the bottom side thereof and coupled to the top coupling flange of said barrel and movable with said cap relative to said barrel between the top coupling flange and the bottom extension tube of said barrel.

8. The plate member fastener as claimed in claim 7, wherein said bottom coupling means of said cap is a bottom coupling flange extending around an inside wall of the bottom side of said cap; said cap has a plurality of longitudinal crevices spaced around the periphery and extended to the bottom side thereof to separate said bottom coupling flange into multiple parts; said bottom coupling flange of said cap has a beveled guide edge for guiding said bottom coupling flange of said cap over said top coupling flange of said barrel during installation of said cap in said barrel.

9. The plate member fastener as claimed in claim 1, wherein said head of said screw member has a tool groove located on a top wall thereof.

10. The plate member fastener as claimed in claim 1, wherein said screw member has at least one retaining rib protruded from the periphery of said shoulder; said spring member has a deformable coiled body received in the inside accommodation space of said barrel around the shank of said screw member, a first end portion extended from one end of said deformable coiled body stopped at the step of said barrel, and a second end portion extended from an opposite end of said deformable coiled body and forced into engagement with said at least one retaining rib of said screw member.

11. The plate member fastener as claimed in claim 1, wherein said cap has an inside retaining groove extending around an inside wall thereof; said head of said screw member has an engagement portion extending around the periphery thereof and forced into engagement with the inside retaining groove of said cap.

12. The plate member fastener as claimed in claim 1, wherein said screw member is a metal screw member; said cap is directly molded from a plastic material on the head of said screw member.

\* \* \* \* \*